US012208452B2

(12) United States Patent
Kesterke, III et al.

(10) Patent No.: US 12,208,452 B2
(45) Date of Patent: Jan. 28, 2025

(54) CHUCK WITH IMPROVED GRIPPING STROKE

(71) Applicant: Hardinge, Inc., Elmira, NY (US)

(72) Inventors: Richard M. Kesterke, III, Lawrenceville, PA (US); Brian Lee Kinney, Traverse City, MI (US); Daniel R. Duell, Traverse City, MI (US); Chun Zhang, Pine City, NY (US)

(73) Assignee: WORKHOLDING US HOLDINGS, LLC, Elmira, NY (US)

( * ) Notice: Subject to any disclaimer, the term of this patent is extended or adjusted under 35 U.S.C. 154(b) by 311 days.

(21) Appl. No.: 17/639,211

(22) PCT Filed: Aug. 27, 2020

(86) PCT No.: PCT/US2020/048176
§ 371 (c)(1),
(2) Date: Feb. 28, 2022

(87) PCT Pub. No.: WO2021/041658
PCT Pub. Date: Mar. 4, 2021

(65) Prior Publication Data
US 2022/0379387 A1  Dec. 1, 2022

(51) Int. Cl.
*B23B 31/177* (2006.01)
*B23B 31/14* (2006.01)
*B23B 31/16* (2006.01)

(52) U.S. Cl.
CPC ........ *B23B 31/16233* (2013.01); *B23B 31/14* (2013.01); *B23B 31/16254* (2013.01);
(Continued)

(58) Field of Classification Search
CPC . B23B 31/14; B23B 31/142; B23B 31/16233; B23B 31/16237;
(Continued)

(56) References Cited

U.S. PATENT DOCUMENTS

| 5,842,703 A | 12/1998 | Antoni |
| 6,343,797 B1 * | 2/2002 | Tajnafoi ............ B23B 31/16295 |
| | | 279/123 |

(Continued)

FOREIGN PATENT DOCUMENTS

| EP | 1407845 A1 | 4/2004 |
| JP | 60177804 A * | 9/1985 |

(Continued)

OTHER PUBLICATIONS

Extended European Search Report dated Aug. 25, 2023, issued in corresponding European Patent Application No. 20859182.6 (7 pgs.).

(Continued)

*Primary Examiner* — Eric A. Gates
(74) *Attorney, Agent, or Firm* — Pillsbury Winthrop Shaw Pittman, LLP (57) ABSTRACT

A chuck for gripping a workpiece includes: a chuck body; a jaw connected to the chuck body for constrained movement relative to the chuck body along a jaw path in jaw-closing and jaw-opening directions; an actuator body connected to the chuck body for constrained movement relative to the chuck body along an actuator path; and a slider body connected to the chuck body for constrained movement relative to the chuck body along a slider body path. The slider body is connected to the jaw for constrained movement relative to the jaw along a slider-body-to-jaw path. The slider body is connected to the actuator body for constrained movement relative to the actuator body along a slider-body-to-actuator-body path.

13 Claims, 6 Drawing Sheets

(52) U.S. Cl.
CPC ..... *B23B 31/16279* (2013.01); *B23B 2231/12* (2013.01); *Y10T 279/1973* (2015.01); *Y10T 279/243* (2015.01)

(58) Field of Classification Search
CPC ........ B23B 31/16241; B23B 31/16245; B23B 31/16254; B23B 31/16258; B23B 2231/12; Y10T 279/1973
See application file for complete search history.

(56) References Cited

U.S. PATENT DOCUMENTS

| | | |
|---|---|---|
| 6,454,278 B1 | 9/2002 | Wrobel et al. |
| 6,953,198 B2 | 11/2005 | Onyszkiewicz et al. |
| 7,311,312 B2 | 12/2007 | Nishimiya et al. |
| 9,321,109 B2 | 4/2016 | Helm et al. |

FOREIGN PATENT DOCUMENTS

| | | | |
|---|---|---|---|
| JP | 61095804 A | * | 5/1986 |
| JP | 2017-087323 A | | 5/2017 |
| JP | 2019-098468 A | | 6/2019 |

OTHER PUBLICATIONS

International Preliminary Report on Patentability dated Sep. 2, 2021, issued in corresponding International Patent Application No. PCT/US2020/048176 (14 pgs.).

International Search Report & Written Opinion of the International Searching Authority dated Nov. 19, 2020, issued in corresponding International Patent Application No. PCT/US2020/048176 (12 pgs.).

* cited by examiner

CHUCK WITH IMPROVED GRIPPING STROKE

CROSS-REFERENCE TO RELATED APPLICATIONS

This application claims priority to International Patent Application No. PCT/US2020/048176, filed Aug. 27, 2020, which claims priority to U.S. Provisional Application No. 62/892,787, filed Aug. 28, 2019, the subject matter of each of which is incorporated herein by reference in entirety.

BACKGROUND

Field of the Invention

Various embodiments relate generally to machine chucks for gripping workpieces.

Description of Related Art

Chucks are used on workpiece processing machines such as lathes to grip a workpiece during processing. Chucks commonly function by converting axial driving movement of an actuator (e.g., pneumatic or hydraulic actuator, drawbar, etc.) into radial movement of the chuck's jaws toward a workpiece to grip the workpiece.

Figure 7:
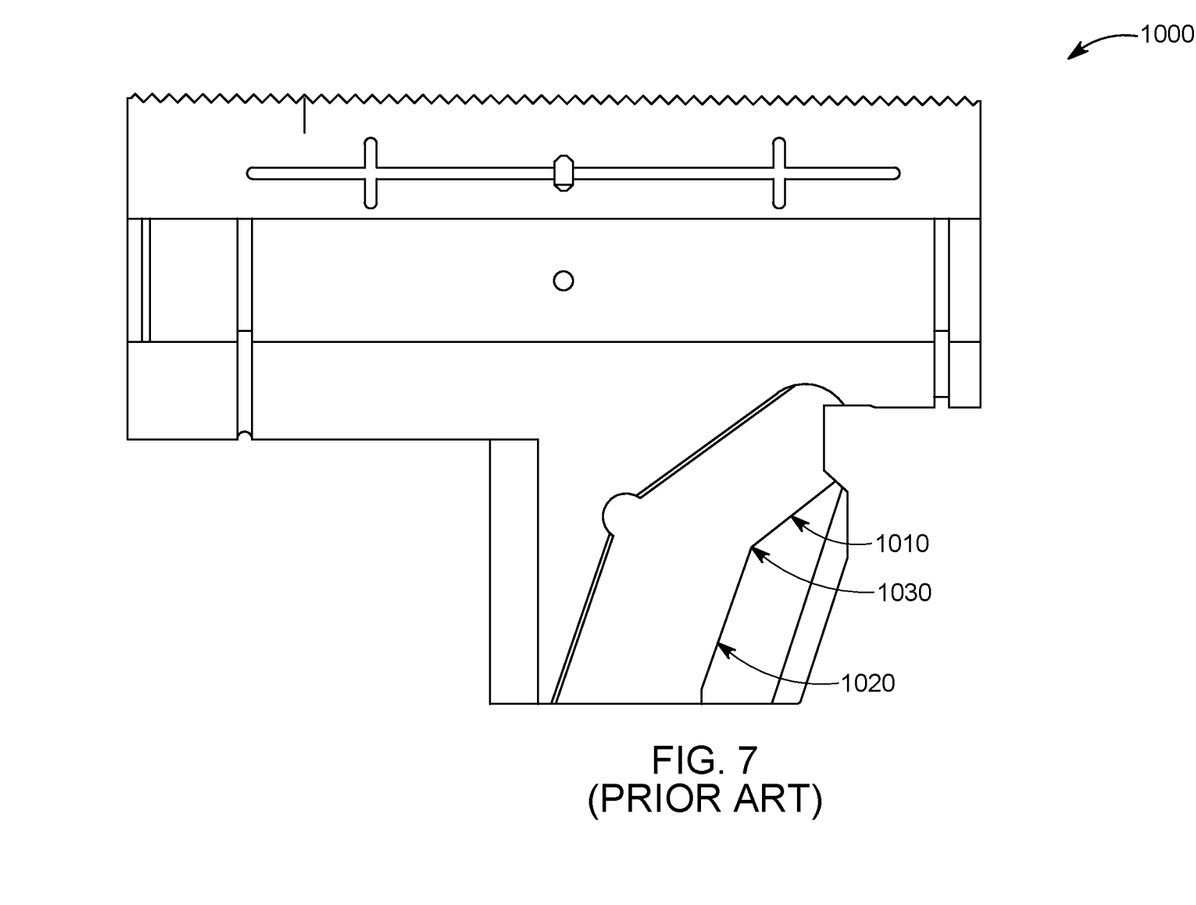
FIG. 7 is a side view of a prior art chuck.

As shown in FIG. 7, one conventional type of chuck 1000 provides a sloped sliding path connection between an actuator body and the jaws. The slope/wedge converts axial movement of the actuator body into radial movement of the jaw. This dual wedge path system provides a separate rapid movement (low force) large wedge angle path 1010 and a discrete slow movement (high gripping force) small wedge angle path 1020. During jaw closing, the jaw first slides over the large wedge angle path 1010 to rapidly close the jaws. The jaw then slides over the small wedge path angle path 1020 to provide high gripping force. During the large wedge angle path 1010 movement, the jaws may provide insufficient gripping force, so dual wedge path systems are only used to grip workpieces within the narrow jaw stroke range that corresponds to the slow-speed, high-force jaw movement associated with the small wedge angle path.

This conventional dual-wedge path chuck 1000 combines the fast travel angle and the slow movement travel into one track (one single path) 1010, 1020. This causes an issue with wear when the jaw "goes around the corner" at the abrupt transition 1030 from the fast travel path 1010 to the slow travel path 1020. This causes heavy wear on the jaws and they must be replaced after a period of time based on chuck usage.

SUMMARY

One or more non-limiting embodiments improve upon conventional chucks 100 by separating the fast and slow travel angle paths and eliminating the wear-prone transition 1020.

One or more non-limiting embodiments provide an improved chuck that (1) is axially compact, and/or (2) provides sufficient gripping force at any point over the jaws' radial stroke so as to accommodate workpieces with widely varying diameters.

One or more non-limiting embodiments provide a chuck for gripping a workpiece, wherein the chuck includes: a chuck body; a jaw connected to the chuck body for constrained movement relative to the chuck body along a jaw path in jaw-closing and jaw-opening directions; an actuator body connected to the chuck body for constrained movement relative to the chuck body along an actuator path; and a slider body connected to the chuck body for constrained movement relative to the chuck body along a slider body path. The slider body is connected to the jaw for constrained movement relative to the jaw along a slider-body-to-jaw path. The slider body is connected to the actuator body for constrained movement relative to the actuator body along a slider-body-to-actuator-body path.

According to one or more of these embodiments, an angle A is formed between the actuator path and slider-body-to-actuator-body path; an angle J is formed between the actuator path and the slider-body-to-jaw path; and the angle A is smaller than the angle J.

According to one or more of these embodiments, an angle S is formed between the slider body path and the slider-body-to-jaw path; and the angle S is between 90° and 135°.

According to one or more of these embodiments, the angle A is between 5 and 40°.

According to one or more of these embodiments, the angle J is between 30 and 60°.

According to one or more of these embodiments, the jaw comprises a first jaw mounted to the chuck body for movement relative to the chuck body along a first-jaw-path in first-jaw-closing and first-jaw-opening directions; the chuck comprises a second jaw mounted to the chuck body for movement relative to the chuck body along a second-jaw-path in second-jaw-closing and second-jaw-opening directions; the slider body comprises a first slider body; the chuck comprises a second slider body interconnecting the second jaw and actuator body so as to transfer movement of the actuator body in the first direction into movement of the second jaw in the second-jaw-closing direction at the ratio of actuator body movement along the actuator path to second jaw movement along the jaw path.

According to one or more of these embodiments, the jaw path and actuator path are each linear.

According to one or more of these embodiments, the slide body path, slider-body-to-jaw path, and slider-body-to-actuator-body path are each linear.

According to one or more of these embodiments, the chuck comprises a through-hole chuck having an axial through hole the is shaped and configured to permit the workpiece to be fed into the chuck from an axial side of the chuck opposite where the jaws are located.

One or more non-limiting embodiments provides a workpiece processing machine (e.g., a lathe) that includes a chuck according to one or more of these embodiments.

According to one or more of these embodiments, the chuck includes a counterweight movably mounted to the chuck body and disposed relative to the slider body so as to apply a radially-inwardly directed force to the slider body when the chuck spins.

One or more of these and/or other aspects of various embodiments of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

All closed-ended (e.g., between A and B) and open-ended (greater than C) ranges of values disclosed herein explicitly include all ranges that fall within or nest within such ranges. For example, a disclosed range of 1-10 is understood as also disclosing, among other ranges, 2-10, 1-9, 3-9, etc. Similarly, where multiple parameters (e.g., parameter C, parameter D) are separately disclosed as having ranges, the embodiments disclosed herein explicitly include embodiments that combine any value within the disclosed range of one parameter (e.g., parameter C) with any value within the disclosed range of any other parameter (e.g., parameter D).

BRIEF DESCRIPTION OF THE DRAWINGS

For a better understanding of various embodiments as well as other objects and further features thereof, reference is made to the following description which is to be used in conjunction with the accompanying drawings, where.

DETAILED DESCRIPTION OF EXEMPLARY EMBODIMENTS

Figure 1:
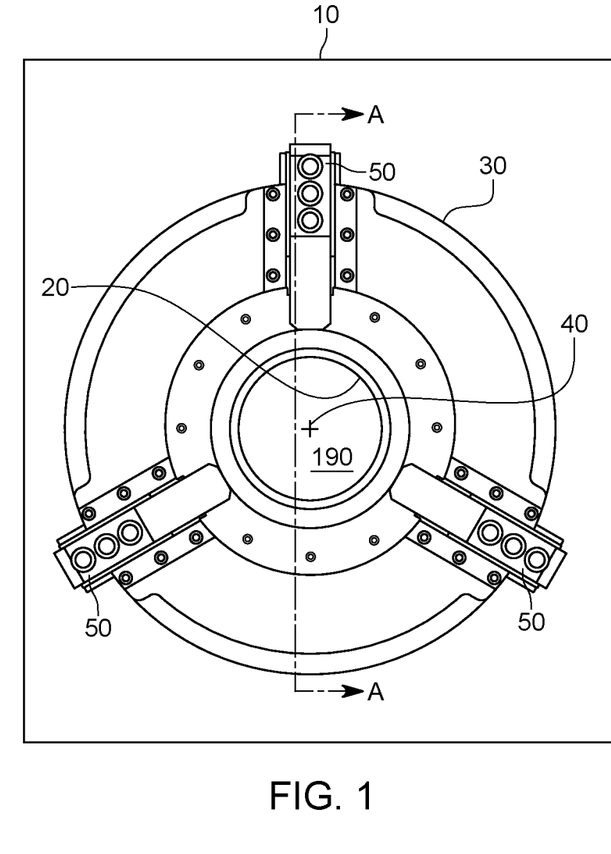
FIG. 1 is a front, partially diagrammatic view of a lathe according to an embodiment.

FIG. 1 illustrates a machine 10 for gripping and processing a workpiece 20. In the illustrated embodiment, the machine 10 comprises a lathe, but may alternatively comprise a variety of other workpiece gripping and/or processing machines (e.g., milling machine, etc.). In the illustrated embodiment, the workpiece 20 comprises tubular stock, but may alternatively comprise any other suitable type of workpiece to be gripped and processed by the machine 10.

Figure 2:
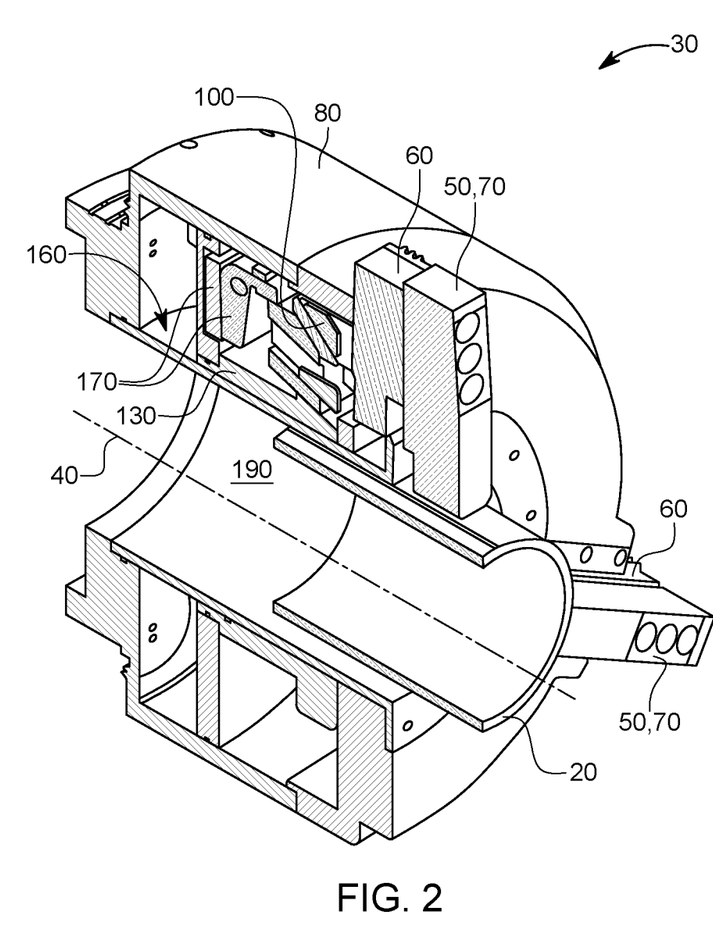
FIG. 2 is a cross-sectional, perspective view of a chuck of the lathe of FIG. 1, taken along the line A-A in FIG. 1.

As shown in FIGS. 1 and 2, the machine 10 includes a chuck 30 that is shaped and configured to selectively grip the workpiece 20 for processing. In the illustrated embodiment, the chuck 30 is mounted to the machine 10 for rotation relative to the rest of the machine 10 about an axis 40. According to various embodiments, the machine 10 includes a motor to rotationally drive the chuck 30 and gripped workpiece 20 about the axis 40, e.g., for lathing operations. However, according to alternative embodiments, the chuck may be non-rotational, or may be freely-rotational (i.e., non-driven).

As shown in FIG. 1, the chuck 30 comprises a plurality of jaws 50 that are circumferentially evenly spaced around the chuck 30. The jaws 50 are simultaneously moved radially inwardly toward the axis 40 to grip the workpiece 20. In this configuration, the chuck 30 operates as an outside-diameter (OD) gripping chuck 30. However, it should be understood that the relative directions of closing could be reversed to provide an inside-diameter (ID) gripping chuck without deviating from the scope of one or more embodiments.

Hereinafter, the structure and operation of one of the jaws 50 is described in detail. It should be understood that this explanation applies equally to the remaining jaws 50, which operate in the same manner.

As shown in FIG. 2, the jaw 50 comprises a master jaw 60 and a top jaw 70. The top jaw 70 is bolted to the master jaw 60 and provides a gripping surface that directly grips the workpiece 20. The top jaw 70 may be switched out for a different top jaw 70, based on the particular gripping requirements for different workpieces 20. As used herein, the master jaw 60, alone, is a jaw, even when a top jaw 70 is not connected thereto.

The jaw 50 (and specifically the master jaw 60), is connected to a body 80 of the chuck 30 for constrained movement relative to the chuck body 80 over a jaw stroke along a jaw path 90 (see FIG. 3) in a jaw-closing direction (toward the axis 40 for an OD-gripping chuck; away from the axis 40 for an ID-gripping chuck) and jaw-opening directions (away from the axis 40 for an OD-gripping chuck; toward the axis 4 for an ID-gripping chuck). In the illustrated embodiment, the jaw path 90 is perpendicular to the rotational axis 40, but may alternatively extend in different directions.

Figure 3:
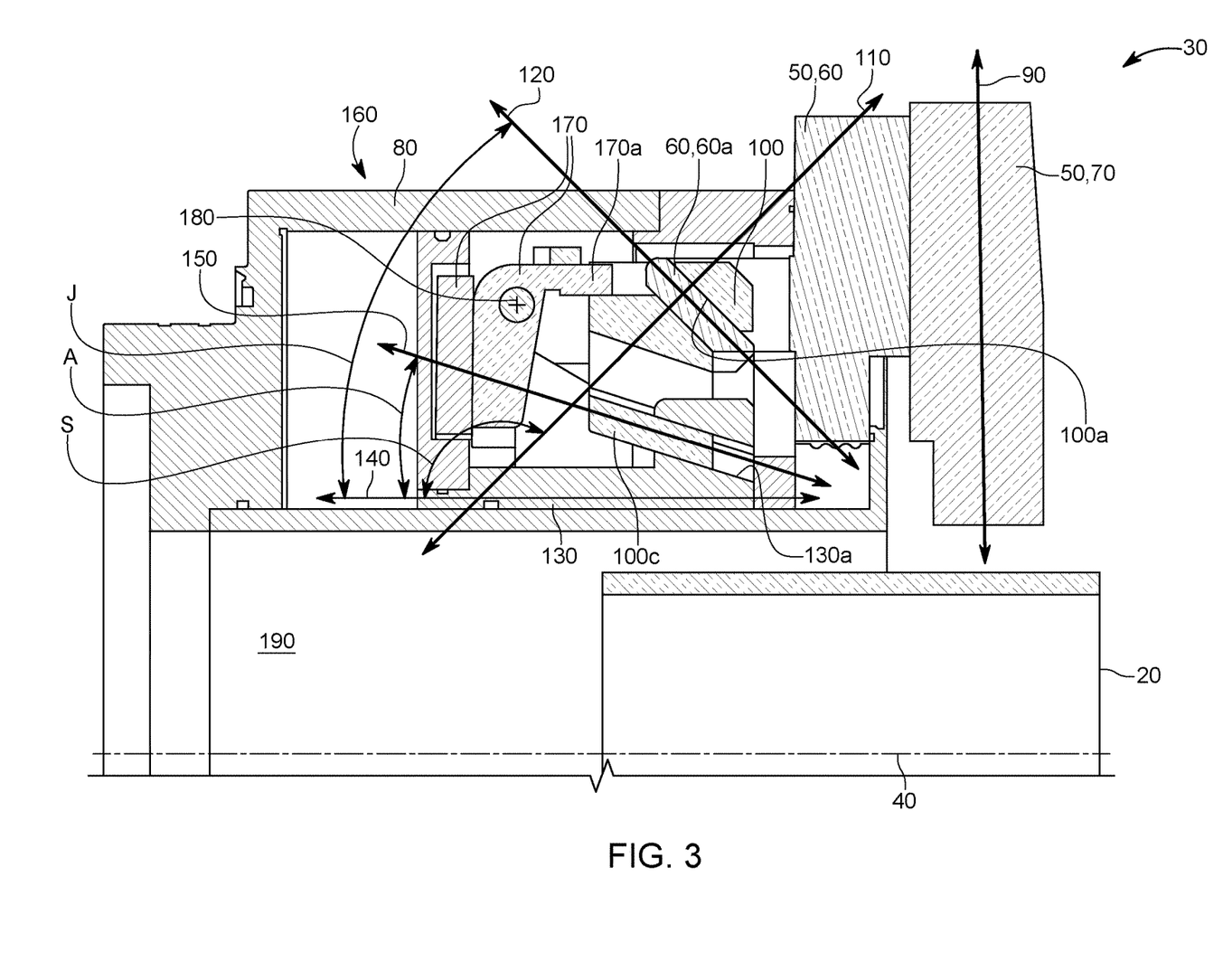
FIG. 3 a cross-sectional, side view of the chuck of the lathe of FIG. 1, taken along the line A-A in FIG. 1, with the chuck's jaw shown in an open position.
Figure 6:
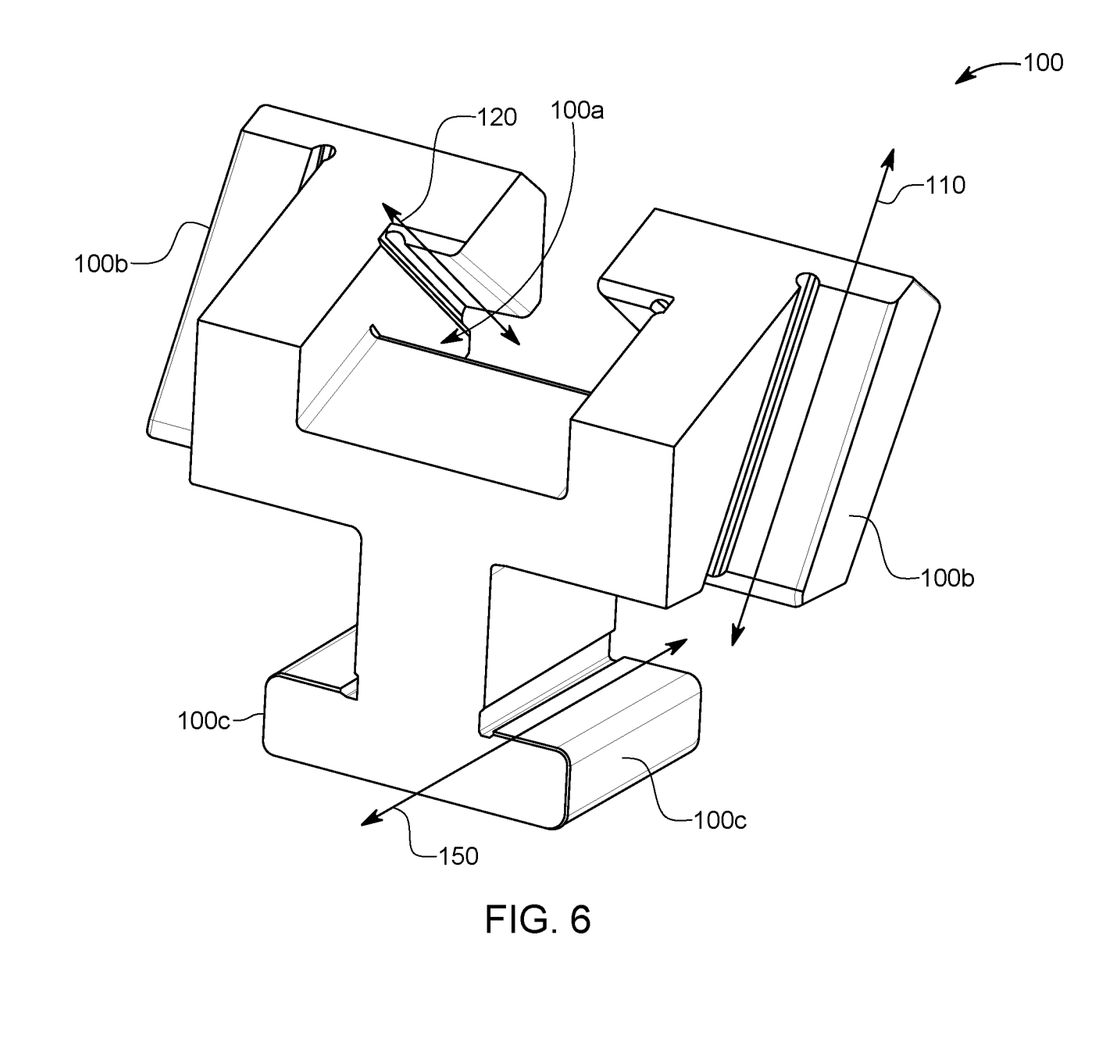
FIG. 6 is a perspective view of a slider body of the chuck of the lathe of FIG. 1.

As shown in FIGS. 2, 3, and 6, the chuck 30 also comprises a slider body 100 for each of the jaws 50. As shown in FIG. 3, the slider body 100 connects to the chuck body 80 for constrained movement relative to the chuck body 80 along a slider body path 110. The slider body 100 connects to the jaw 50 for constrained movement relative to the jaw 50 along a slider-body-to-jaw path 120.

As shown in FIGS. 2 and 3, the chuck 30 also comprises an actuator body 130 that connects to the chuck body 80 for constrained movement relative to the chuck body 80 along an actuator path 140 over an actuator stroke. In the illustrated embodiment, the actuator path 140 is parallel to the axis 40 and perpendicular to the jaw path 90. The actuator body 130 connects to the slider body 100 for constrained movement relative to the slider body 100 along a slider-body-to-actuator-body path 150.

As shown in FIGS. 2-3, chuck includes an actuator 160 that connects to the actuator body 130 so as to selectively drive the actuator body 130 along the actuator path 140 over the actuator stroke. In the illustrated embodiment, the actuator 160 comprises a spring-closed, pneumatic-open actuator 130 that provides a failsafe closed/gripping position. However, according to alternative embodiments, any other suitable actuator may be used (a pneumatic-closed, spring-open actuator; a hydraulic actuator; a manual draw-bar based actuator; etc.).

As shown in FIG. 3, the slider-body-to-actuator-body path 150 forms an angle A with the actuator path 140. According to various embodiments, the angle A is (1) greater than 5, 10, 15, and/or 20°, (2) less than 45, 40, 35, 30, and/or 20°, and/or (3) between any two such values (e.g., between 5 and 45°, between 10 and 40°, between 15 and 25°).

As shown in FIG. 3, the jaw path 120 forms an angle J with the actuator path 140. According to various embodiments, the angle J is (1) greater than 20, 25, 30, 35, and/or 40°, (2) less than 75, 70, 65, 60, 55, and/or 50°, and/or (3)

between any two such values (e.g., between 20 and 75°, between 30 and 55°, between 40 and 50°).

As shown in FIG. 3, the slider body path 110 forms an angle S with the actuator path 140. According to various embodiments, the angle S is (1) greater than 110, 115, 120, and/or 125°, (2) less than 165, 160, 155, 150, 145, and/or 140°, and/or (3) between any two such values (e.g., between 20 and 75°, between 30 and 55°, between 40 and 50°). According to various embodiments, the paths 110, 120 are perpendicular to each other (such that angle J minus angle S equals 90°) or, according to various embodiments, are within 20, 15, 10, and/or 5 degrees of being perpendicular to each other.

According to various embodiments, the slider body path 110 slopes away from the axis 40 as the slider body path 110 progresses toward the jaw 50. Conversely, the slider-body-to-jaw path 120 and slider-body-to-actuator-body path 150 both slope toward the axis 40 as they progress toward the jaw 50.

The paths 90, 110, 120, 140, 150 are defined by mating sliding surfaces in the respective components 50/60, 80, 100, 130. In the illustrated embodiment, the paths 90, 110, 120, 150 are formed by a 2-sided track (or tracks) in one component and a mating protrusion (or protrusions) in the other component, such that the protrusion slides within the two sides of the track. For example, track 80a in the chuck body 80 (see FIG. 4) mates with protrusion 100b (see FIG. 6) of the slider body 100 to define the path 110. Protrusion 60a of the master jaw 60 (see FIG. 3) mates with track 100a (see FIGS. 3, 6) of the slider body 100 to define path 120. Protrusion 100c (see FIGS. 3, 6) of the slider body 100 mates with track 130a (see FIG. 3) in the actuator body 130 to define the path 150.

The relative position of the tracks 80a, 100a, 130a and protrusions 60a, 100b, 100c may be reversed without deviating from the scope of one or more embodiments. Moreover, according to alternative embodiments, alternative types of structural connections between the components may be used to define the paths 90, 110, 120, 150 (e.g., any structural connection that provides 1 curvilinear or linear translational degree-of-freedom between the two interconnected components, a linear bearing, etc.).

In the illustrated embodiments, the paths 90, 110, 120, 150 are linear. However, according to alternative embodiments, one or more of the paths 90, 110, 120, 150 may have other shapes (e.g., a simple curve, a compound curve, a path formed by a combination of curve(s) and line(s), etc.).

Figure 4:
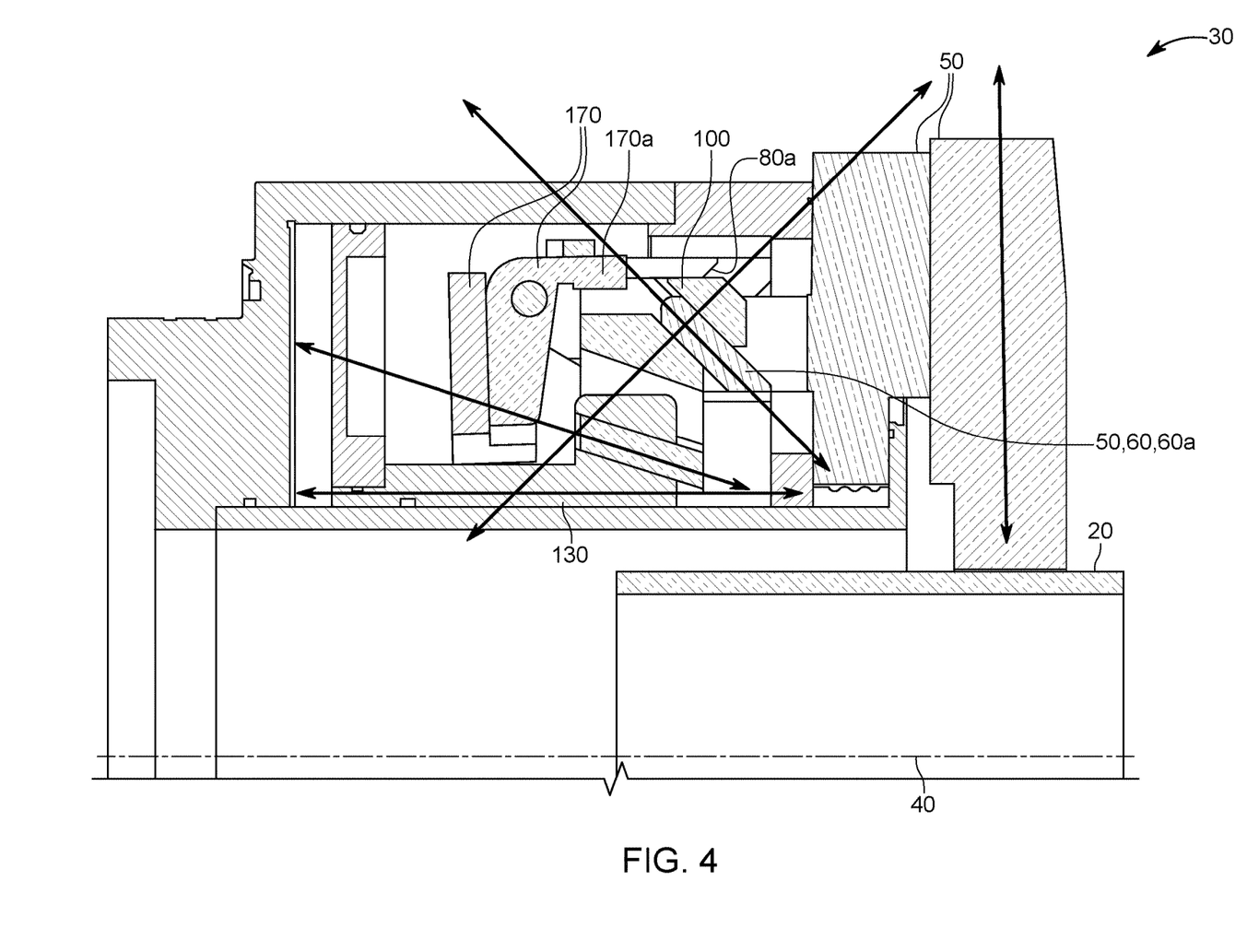
FIG. 4 a cross-sectional, side view of the chuck of the lathe of FIG. 1, taken along the line A-A in FIG. 1, with the chuck's jaw shown in a closed, static position.

Operation of the chuck 30 to grip the workpiece 20 is illustrated in FIGS. 3-4. When the chuck 30 is open (as shown in FIG. 3), the chuck 30 can be closed by actuating the actuator 160 so as to drive the actuator body 130 along the path 130 away from the jaw 50 (i.e., to the left as illustrated in FIGS. 3-4). This movement causes the actuator body 130 to slide relative to the slider body 100 along the path 150 (towards the left and slightly upward as shown in FIG. 3), which causes the slider body 100 to slide relative to the chuck body 80 along the path 110 (towards the lower left as shown in FIG. 3), which causes the jaw 50 to slide relative to the slider body 100 along the path 120 (toward the lower right as shown in FIG. 3), which causes the jaw 50 to slide relative to the chuck body 80 along the path 90 in the closing direction (downward as shown in FIG. 3) until the jaw 50 (along with the other jaws 50 (not shown in FIGS. 3-4) that are spaced around the chuck 30) contacts and grips the workpiece 20, as shown in FIG. 4.

The use of the slider body 100 and combination of interconnected components and paths 90, 110, 120, 150 provides, according to one or more non-limiting embodiments, a jaw 50 closing system that (1) is axially compact (along the axis 40), (2) provides sufficient mechanical advantage between the actuator body 130 movement and jaw 50 closing movement to securely grip the workpiece 20 at any point over the jaw stroke so as to accommodate workpieces 20 having a variety of diameters, and/or (3) provides a fast closing speed for the jaw 50. If the actuator body 130 were directly connected to the jaw 50 along the high angle J path 120, that high angle J might provide a good jaw 50 closing speed, but at the expense of reduced gripping force. If the actuator body 130 were directly connected to the jaw 50 along the low angle A path 150, the low angle A might provide good gripping force, but at the expense of jaw 50 closing speed. If the actuator body 130 were directly connected to the jaw 50 along an intermediate angle (e.g., somewhere between angles A and J), the required path length would axially lengthen the chuck 30.

According to various embodiments, the angles A, J, and S may be selected to optimize the competing interests of providing (1) a fast jaw closing speed, (2) high jaw gripping force, and/or (3) an axially compact chuck for which the axial stroke along each path is minimized.

Figure 5:
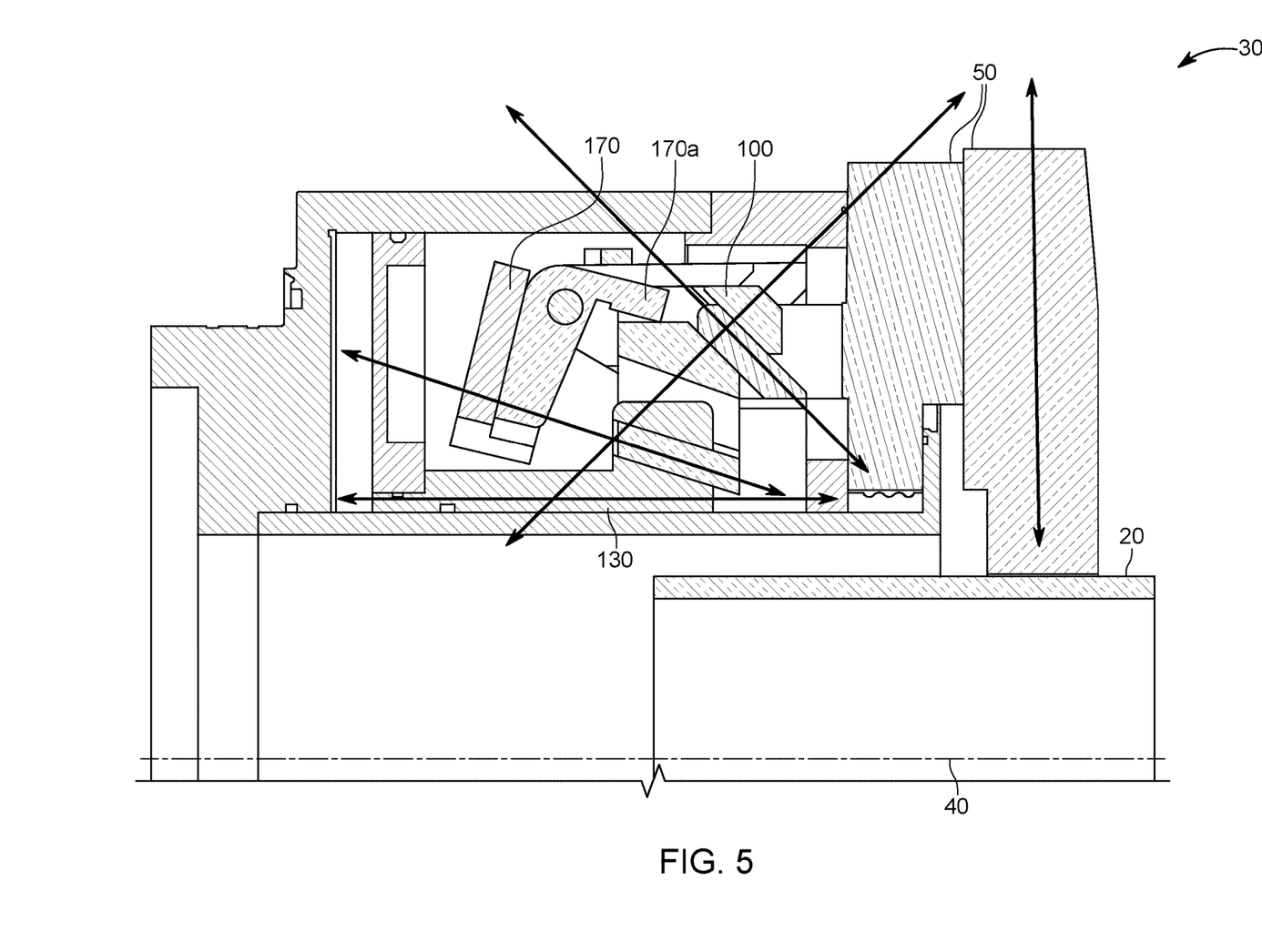
FIG. 5 a cross-sectional, side view of the chuck of the lathe of FIG. 1, taken along the line A-A in FIG. 1, with the chuck's jaw shown in a closed, rotating position (with the counterweight acting on the chuck to help keep the chuck closed)

As shown in FIGS. 2-5, the chuck 30 may also include a counterweight system that is designed to partially compensate for the loss of jaw 50 OD-gripping force that would otherwise occur when the chuck 30 spins and centrifugal forces tend to push the jaws 50 and slider blocks 100 radially outwardly away from the axis 40. As shown in FIGS. 2-4, a counterweight 170 may be provided for each set of a jaw 50 and slider body 100. The counterweight 170 pivotally connects to the chuck body 80 for relative pivotal movement about a counterweight axis 180. As shown in FIG. 3, when the chuck 30 is open, an arm 80a of the counterweight rests against the slider body 100. As shown in FIG. 4, when the jaws 50 close and the chuck 30 is static (i.e., not spinning about its axis 40), the counterweight 170 is spaced from the slider body 100. As shown in FIG. 5, when the chuck 30 spins and the jaws 50 are closed (e.g., to grip the workpiece 20), centrifugal force pivots the counterweight 170 radially outwardly (clockwise as shown in FIGS. 3-5), which causes the counterweight's arm 170a to contact and push radially inwardly against the slider body 100. That inward radial force tends to increase the gripping force being applied by the jaws 50, which at least partially counteracts the loss of gripping force caused by centrifugal forces that tend to push the slider body 100 and jaws 50 radially outwardly.

While the illustrated chuck 30 and jaw 50 closing mechanism is configured for OD-gripping. Those of ordinary skill in the art will appreciate that the relative directions, angles, or other aspects of the chuck 30 can be adjusted to additionally and/or alternatively provide ID-gripping.

The chuck 30 is a through-hole chuck that includes an axial through hole 190 extending along the axis 40. The through hole 190 enables workpiece 20 stock to be fed into the machine 10 via the hole 190 (i.e., from the left as shown in FIG. 3) and be processed (e.g., turned, lathed, milled) on the other axial side of the chuck 30 (to the right of the chuck 30 as shown in FIG. 3).

The foregoing illustrated embodiments are provided to illustrate the structural and functional principles of various embodiments and are not intended to be limiting. To the contrary, the principles of the present invention are intended to encompass any and all changes, alterations and/or substitutions thereof (e.g., any alterations within the spirit and scope of the following claims).

What is claimed is:

1. A chuck for gripping a workpiece, the chuck comprising:
   a chuck body;
   a jaw connected to the chuck body for constrained movement relative to the chuck body along a jaw path in jaw-closing and jaw-opening directions;
   an actuator body connected to the chuck body for constrained movement relative to the chuck body along an actuator path; and
   a slider body connected to the chuck body for constrained movement relative to the chuck body along a slider body path having one curvilinear or linear translational degree-of-freedom,
   wherein the slider body is connected to the jaw for constrained movement relative to the jaw along a slider-body-to-jaw path,
   wherein the slider body is connected to the actuator body for constrained movement relative to the actuator body along a slider-body-to-actuator-body path, wherein an angle A formed between the actuator path and slider-body-to-actuator-body path is greater than 5°,
   an angle J is formed between the actuator path and the slider-body-to-jaw path, and
   the angle A is smaller than the angle J.

2. The chuck of claim 1, wherein the angle A is between 5 and 40°.

3. The chuck of claim 1, wherein the angle J is between 3° and 60°.

4. The chuck of claim 1, wherein:
   the jaw comprises a first jaw mounted to the chuck body for movement relative to the chuck body along a first-jaw-path in first-jaw-closing and first-jaw-opening directions;
   the chuck comprises a second jaw mounted to the chuck body for movement relative to the chuck body along a second-jaw-path in second-jaw-closing and second-jaw-opening directions;
   the slider body comprises a first slider body; and
   the chuck comprises a second slider body interconnecting the second jaw and actuator body so as to transfer movement of the actuator body in the first direction into movement of the second jaw in the second-jaw-closing direction at the ratio of actuator body movement along the actuator path to second jaw movement along the jaw path.

5. The chuck of claim 1, wherein the jaw path and actuator path are each linear.

6. The chuck of claim 1, wherein chuck comprises a through-hole chuck having an axial through hole that is shaped and configured to permit the workpiece to be fed into the chuck from an axial side of the chuck opposite where the jaws are located.

7. The chuck of claim 1, in combination with a workpiece processing machine.

8. The combination of claim 7, wherein the workpiece processing machine is a lathe.

9. The chuck of claim 1, further comprising a counterweight movably mounted to the chuck body and disposed relative to the slider body so as to apply a radially-inwardly directed force to the slider body when the chuck spins.

10. The chuck of claim 1, wherein the slider body is connected to the actuator body for constrained movement relative to the actuator body along the slider-body-to-actuator-body path during movement of the jaw in jaw-opening and jaw-closing directions.

11. The chuck of claim 1, wherein an angle S is formed between the slider body path and the actuator path, and the angle S is between 110° and 165°.

12. A chuck for gripping a workpiece, the chuck comprising:
   a chuck body;
   a jaw connected to the chuck body for constrained movement relative to the chuck body along a jaw path in jaw-closing and jaw-opening directions;
   an actuator body connected to the chuck body for constrained movement relative to the chuck body along an actuator path; and
   a slider body connected to the chuck body for constrained movement relative to the chuck body along a slider body path,
   wherein the slider body is connected to the jaw for constrained movement relative to the jaw along a slider-body-to-jaw path,
   wherein the slider body is connected to the actuator body for constrained movement relative to the actuator body along a slider-body-to-actuator-body path,
   wherein an angle A is formed between the actuator path and slider-body-to-actuator-body path,
   wherein an angle J is formed between the actuator path and the slider-body-to-jaw path,
   wherein the angle A is smaller than the angle J,
   wherein an angle S is formed between the slider body path and the slider-body-to-jaw path, and
   wherein the angle S is between 90° and 135°.

13. A chuck for gripping a workpiece, the chuck comprising:
   a chuck body;
   a jaw connected to the chuck body for constrained movement relative to the chuck body along a jaw path in jaw-closing and jaw-opening directions;
   an actuator body connected to the chuck body for constrained movement relative to the chuck body along an actuator path; and
   a slider body connected to the chuck body for constrained movement relative to the chuck body along a slider body path having one curvilinear or linear translational degree-of-freedom,
   wherein the slider body is connected to the jaw for constrained movement relative to the jaw along a slider-body-to-jaw path,
   wherein the slider body is connected to the actuator body for constrained movement relative to the actuator body along a slider-body-to-actuator-body path, and
   wherein an angle A formed between the actuator path and slider-body-to-actuator-body path is greater than 5°,
   wherein the slide body path, slider-body-to-jaw path, and slider-body-to-actuator-body path are each linear.

* * * * *

UNITED STATES PATENT AND TRADEMARK OFFICE
CERTIFICATE OF CORRECTION

PATENT NO. : 12,208,452 B2
APPLICATION NO. : 17/639211
DATED : January 28, 2025
INVENTOR(S) : Richard M. Kesterke, III et al.

Page 1 of 1

It is certified that error appears in the above-identified patent and that said Letters Patent is hereby corrected as shown below:

On the Title Page

Item [60], insert:
--Provisional application No. 62/892,787, filed on August 28 2019.--

Signed and Sealed this
Sixth Day of January, 2026

John A. Squires
*Director of the United States Patent and Trademark Office*